(12) United States Patent
Wakabayashi

(10) Patent No.: US 12,221,994 B2
(45) Date of Patent: Feb. 11, 2025

(54) LOOSENING PREVENTION DEVICE

(71) Applicant: HARDLOCK INDUSTRY CO., LTD., Osaka (JP)

(72) Inventor: Katsuhiko Wakabayashi, Osaka (JP)

(73) Assignee: Hardlock Industry Co., Ltd., Osaka (JP)

(*) Notice: Subject to any disclaimer, the term of this patent is extended or adjusted under 35 U.S.C. 154(b) by 81 days.

(21) Appl. No.: 17/786,690

(22) PCT Filed: Sep. 29, 2020

(86) PCT No.: PCT/JP2020/036847
§ 371 (c)(1),
(2) Date: Jun. 17, 2022

(87) PCT Pub. No.: WO2021/124636
PCT Pub. Date: Jun. 24, 2021

(65) Prior Publication Data
US 2023/0020266 A1   Jan. 19, 2023

(30) Foreign Application Priority Data

Dec. 20, 2019 (JP) .................................. 2019-230031

(51) Int. Cl.
*F16B 39/12* (2006.01)
*F16B 39/18* (2006.01)

(52) U.S. Cl.
CPC ............ *F16B 39/128* (2013.01); *F16B 39/18* (2013.01)

(58) Field of Classification Search
CPC ...... F16B 39/122; F16B 39/128; F16B 39/12; F16B 39/36; F16B 39/126; F16N 39/18
(Continued)

(56) References Cited

U.S. PATENT DOCUMENTS

| 421,358 A | * | 2/1890 | McDonah |
| 1,271,449 A | * | 7/1918 | Drake ..................... F16B 39/36 |
| | | | 411/935 |

(Continued)

FOREIGN PATENT DOCUMENTS

| JP | S61244912 A | 10/1986 |
| JP | 11-315816 A | 11/1999 |

(Continued)

OTHER PUBLICATIONS

International Search Report dated Nov. 2, 2020.
Supplementary European Search Report issued Nov. 28, 2023, in European Patent Application No. EP 20 90 3780.

*Primary Examiner* — Gary W Estremsky
(74) *Attorney, Agent, or Firm* — Wood, Phillips, Katz, Clark & Mortimer

(57) ABSTRACT

An object of the present invention is to provide an anti-loosening device that exhibits its anti-loosening effect by means of an eccentric fit between a protrusion 12 of a nut 10 and a recess 22 in a nut 20, wherein the inclination of the nut 20 relative to the nut 10 when they have been tightened is minimized. The outer peripheral surface of the protrusion 12 and the inner peripheral surface of the recess 22 are constructed in such a manner that, with the nuts screwed to a threaded shaft S and an eccentric fit established between the protrusion 12 of the nut 10 and the recess 22 in the nut 20, the tapered outer peripheral surface portion 12a of the protrusion 12 interferes with the tapered inner peripheral surface portion 22a of the recess 22 along part of the circumference while a gap is formed between the distal-end outer peripheral surface portion 12b of the protrusion 12 and the closer-to-bottom inner peripheral surface portion 22b of the recess 22 along the entire circumference.

3 Claims, 10 Drawing Sheets

(58) Field of Classification Search
USPC .......................................................... 411/238
See application file for complete search history.

(56) References Cited

U.S. PATENT DOCUMENTS

| | | | | |
|---|---|---|---|---|
| 1,891,358 | A * | 12/1932 | Pickop | F16B 39/12 411/935 |
| 1,928,982 | A * | 10/1933 | Rosenbaum | F16B 39/36 411/222 |
| 2,554,448 | A * | 5/1951 | Sherwood | F16B 39/36 411/935 |
| 2,564,511 | A * | 8/1951 | Smith, Jr. | F16B 39/36 411/270 |
| 2,605,804 | A * | 8/1952 | Woodling | F16B 39/36 411/270 |
| 4,352,219 | A * | 10/1982 | McMurray | B21K 1/707 470/19 |
| 4,729,703 | A * | 3/1988 | Sato | F16B 39/12 411/238 |
| 2002/0044849 | A1 * | 4/2002 | Wakabayashi | F16B 39/128 411/222 |
| 2007/0269286 | A1 * | 11/2007 | Wakabayashi | F16B 39/12 411/102 |
| 2012/0141225 | A1 * | 6/2012 | Komsitsky | F16B 39/282 470/18 |
| 2015/0135510 | A1 * | 5/2015 | Agarwal | F16B 39/32 29/225 |
| 2016/0131173 | A1 | 5/2016 | Shirayanagi | |
| 2019/0048909 | A1 | 2/2019 | Wakabayashi | |

FOREIGN PATENT DOCUMENTS

| | | |
|---|---|---|
| JP | 2001050292 A | 2/2001 |
| JP | 2002195236 A | 7/2002 |
| JP | 2003 120633 A | 4/2003 |
| JP | 2005-114055 A | 4/2005 |
| JP | 2006281493 A | 10/2006 |
| JP | 2015-14295 A | 1/2015 |
| JP | 2016125622 A | 7/2016 |
| JP | 2016133136 A | 7/2016 |
| JP | 2017219117 A | 12/2017 |
| WO | 2005/080807 A1 | 9/2005 |

* cited by examiner

LOOSENING PREVENTION DEVICE

TECHNICAL FIELD

The present invention relates to an anti-loosening device that can be suitably implemented as an anti-loosening special double nut or set screw.

BACKGROUND ART

The applicant of the present application has developed Hardlock Nuts ("HARDLOCK" is a trademark of the applicant of the present application) and Hardlock Set Screws (trademark "HLS"), which are anti-loosening nuts that exhibit high anti-loosening capabilities, examples of which are disclosed in Patent Documents 1 to 4, listed below.

As shown in FIG. 9, such a Hardlock Nut is composed of a first nut 110 (i.e., first threaded member) having a threaded hole 111 into which a threaded shaft S is screwed, and a second nut 120 (i.e., second threaded member) having a threaded hole 121 into which the threaded shaft S is screwed.

The nut 110 includes a protrusion 112 shaped as a truncated cone protruding in the axial direction toward the nut 120. The protrusion 112 includes a tapered outer peripheral surface 112a having a predetermined taper angle with a diameter that gradually decreases toward the distal end. The threaded hole 111 in the nut 110 extends through the protrusion 112 in the axial direction.

The nut 120 includes a recess 122 that is to be engaged by the protrusion 112. The recess 122 includes a tapered inner peripheral surface 122a with a taper angle that conforms with the taper, and preferably equal to the taper angle, of the outer peripheral surface of the protrusion 112. The threaded hole 121 in the nut 120 is open in the bottom surface of the recess 122.

In a Hardlock Nut, the protrusion 112 of the nut 110 and the recess 122 in the nut 120 are brought to an eccentric fit such that the threaded shaft S and nuts 110, 120 are in such a stress state as if a wedge had been hammered between the shaft and the nuts, and this wedge effect enables the Hardlock Nut to exhibit a powerful anti-loosening effect.

An eccentric fit between the protrusion 112 and recess 122 is achieved by forming a nut 110 including a protrusion 112 with an outer peripheral surface that is eccentric from the threaded hole 111, or by forming a nut 120 including a recess 122 with an inner peripheral surface eccentric from the threaded hole 121. In cases where the outer peripheral surface of the protrusion 112 is eccentric from the threaded hole 111, as shown in FIG. 7, the inner peripheral surface of the recess 122 and the threaded hole 121 are to be concentric with each other. In other cases where the inner peripheral surface of the recess 122 is eccentric from the threaded hole 121 (not shown), the outer peripheral surface of the protrusion 112 and the threaded hole 111 are to be concentric.

In a Hardlock Nut, with the nuts screwed onto the threaded shaft S and an eccentric fit established between the protrusion 112 of the nut 110 and the recess 122 in the nut 120, the outer peripheral surface of the protrusion 112 and the inner peripheral surface of the recess 122 interfere with each other along part of their circumference so as to produce pressing forces generally in the direction of eccentricity in the nuts 110 and 120. Further, the larger the depth of fitting of the protrusion 112 into the recess 122, the larger the pressing forces generally in the direction of eccentricity.

Patent Document 5 discloses a pivot-mounting device in which the anti-loosening principle of Hardlock Nuts is applied. In this pivot-mounting device, the outer peripheral surface of the boss and the inner peripheral surface of the engagement recess are both shaped as straight cylinders such that the pressing forces in the first and second nuts in directions perpendicular to their axis remain constant even when the depth of fitting of the boss into the engagement recess changes. Patent Documents 6 and 7 each disclose a set screw with anti-loosening capabilities (under the product name "Hardlock Set Screw", abbreviated "HLS"). In these HLSs, the recess/protrusion-based eccentric fit arrangement of a Hardlock Nut is applied to set screws.

PRIOR ART DOCUMENTS

Patent Documents

Patent Document 1: JP 2016-125622 A
Patent Document 2: JP 2016-133136 A
Patent Document 3: JP 2002-195236 A
Patent Document 4: JP Sho61(1986)-244912 A
Patent Document 5: JP 2017-219117
Patent Document 6: JP 2001-50292 A
Patent Document 7: JP 2006-281493 A

SUMMARY OF THE INVENTION

Problems to be Solved by the Invention

The conventional Hardlock Nuts and HLSs are designed such that, with a fit established between the protrusion 112 and recess 122, the tapered outer peripheral surface of the protrusion 112 and the tapered inner peripheral surface of the recess 122 slightly interfere with each other along part of their circumference, as shown in FIG. 7, such that the eccentric fit between the protrusion 112 and recess 122 produces a powerful wedge effect.

As such, when the lower nut 110 including the protrusion 112 is tightened on the threaded shaft S and then the upper nut 120 including the recess 122 is tightened, the upper nut 120 is inclined relative to the threaded shaft S and lower nut 110 in an actual tightened state, as shown in FIG. 9, already discussed in Patent Documents 1 and 5.

If the protrusion 112 is fitted into the recess 122 with the upper nut 120 thus inclined, contact pressures between the outer peripheral surface of the protrusion 112 and the inner peripheral surface of the recess 122 are concentrated near the distal end of the protrusion 112, making it difficult to disperse, over a wide axial range of the lower nut 110, forces acting in directions perpendicular to the axial direction for producing the above-discussed wedge effect.

Moreover, in the upper nut 120 tightened in an inclined state, the conditions of contact between the female thread of the threaded hole 121 and the male thread of the threaded shaft S are non-uniform depending on the axial location such that the forces acting in directions perpendicular to the axial direction for producing the wedge effect are not dispersed uniformly over a wide axial range of the upper nut 120.

Although the conventional Hardlock Nuts sufficiently exhibit the anti-loosening effect, a large gap is created between the lower and upper nuts 110 and 120 since the upper nut 120 is inclined when tightening is completed. Such a large gap is not preferable from the viewpoint of construction management.

An object of the present invention is to minimize the inclination of the first and second threaded members relative to each other when they have been tightened.

Means for Solving the Problems

An anti-loosening device according to the present invention includes: a first threaded member having a thread adapted to be screwed to a member to which an object is to be attached (hereinafter "mounted member"), and a second threaded member having a thread adapted to be screwed to the mounted member.

The first threaded member includes a protrusion protruding in an axial direction toward the second threaded member. The protrusion includes an outer peripheral surface including a tapered outer peripheral surface portion with a predetermined taper angle. If the first threaded member is constituted by a nut, the threaded hole may extend through the protrusion in the axial direction.

The second threaded member includes a recess adapted to allow the protrusion to be fitted therein. The recess includes an inner peripheral surface including a tapered inner peripheral surface portion with a predetermined taper angle. If the second threaded member is constituted by a nut, the threaded hole may be open in the bottom surface of the recess.

In the anti-loosening device according to the present invention, (1) the tapered outer peripheral surface portion of the protrusion may be eccentric from the thread on the first threaded member and the tapered inner peripheral surface portion of the recess may be concentric with the thread on the second threaded member, or (2) the tapered inner peripheral surface portion of the recess may be eccentric from the thread on the second threaded member and the tapered outer peripheral surface portion of the protrusion may be concentric with the thread on the first threaded member.

The anti-loosening device according to the present invention is constructed in such a manner that, with the first and second threaded members screwed to the mounted member and an eccentric fit established between the protrusion of the first threaded member and the recess in the second threaded member, the tapered outer peripheral surface and the tapered inner peripheral surface interfere with each other along part of a circumference so as to produce a pressing force in a direction of eccentricity of the eccentric fit in the first and second threaded members, and the larger a depth of fitting of the protrusion into the recess, the larger the pressing force.

The outer peripheral surface of the protrusion of the first threaded member may further include a distal-end outer peripheral surface portion located closer to a distal end of the protrusion than the tapered outer peripheral surface portion is.

The inner peripheral surface of the recess in the second threaded member may further include a closer-to-bottom inner peripheral surface portion located closer to a bottom of the recess than the tapered inner peripheral surface portion is. As used herein, "closer to the bottom of the recess" means being located further toward the interior of the recess as determined along the depth direction.

In the anti-loosening device according to the present invention, the outer peripheral surface of the protrusion and the inner peripheral surface of the recess may be constructed in such a manner that, with the first and second threaded members screwed to the mounted member and an eccentric fit established between the protrusion of the first threaded member and the recess in the second threaded member, the tapered outer peripheral surface portion of the protrusion interferes with the tapered inner peripheral surface portion of the recess along part of the circumference while a gap is formed between the distal-end outer peripheral surface portion of the protrusion and the closer-to-bottom inner peripheral surface portion of the recess along the entire circumference. That is, with the first and second threaded members screwed to the mounted member and an eccentric fit established between the protrusion of the first threaded member and the recess in the second threaded member, the tapered outer peripheral surface portion of the protrusion is inserted into the closer-to-bottom inner peripheral surface portion of the recess.

The outer peripheral surface of the protrusion may be a taper surface having a predetermined taper angle along an entire axial range including the tapered outer peripheral surface portion and the distal-end outer peripheral surface portion. The tapered inner peripheral surface portion of the recess may have the same taper angle as the outer peripheral surface of the protrusion and the closer-to-bottom inner peripheral surface portion of the recess may have a smaller taper angle than the outer peripheral surface of the protrusion. The tapered inner peripheral surface portion of the recess and the closer-to-bottom inner peripheral surface portion of the recess may be constructed in such a manner that, with the eccentric fit established between the protrusion and the recess, the tapered inner peripheral surface portion interferes with the tapered outer peripheral surface portion of the protrusion along part of the circumference and the closer-to-bottom inner peripheral surface portion is gradually radially distanced further from the distal-end outer peripheral surface portion of the protrusion toward the bottom of the recess.

The closer-to-bottom inner peripheral surface portion of the recess may be a straight circular cylindrical surface with a taper angle of 0°.

In one aspect, the mounted member may be a threaded shaft with a male thread provided on its outer periphery, each of the first and second threaded members may be a nut into which the threaded shaft is to be screwed, and each of the threads on the first and second threaded members may be constituted by a female thread.

In another aspect, the mounted member may include a threaded hole with a female thread provided on its inner periphery, each of the first and second threaded members may be a screw that screws into the threaded hole, and each of the threads on the first and second threaded members may be constituted by a male thread.

Effects of the Invention

The present invention will minimize the inclination of the first threaded member relative to the screwed threaded member. This will mitigate stress concentration upon eccentric fitting between the protrusion and recess to efficiently produce pressing forces in radial directions generally along the direction of eccentricity in the first and second threaded members, thereby further increasing the anti-loosening effect.

EMBODIMENTS FOR CARRYING OUT THE INVENTION

Figure 1:
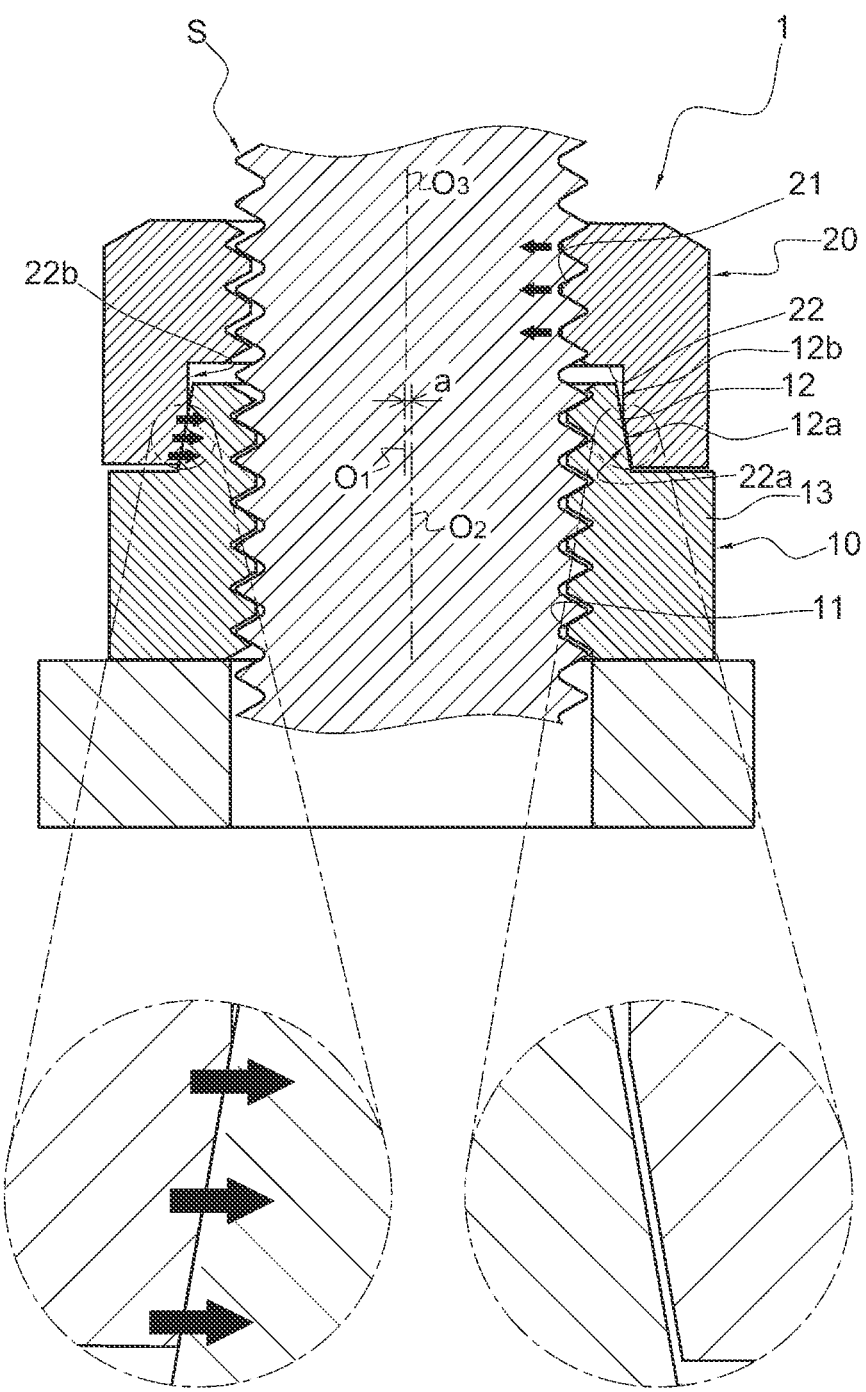
FIG. 1 is a cross-sectional view of an anti-loosening device according to a first embodiment.
Figure 2:
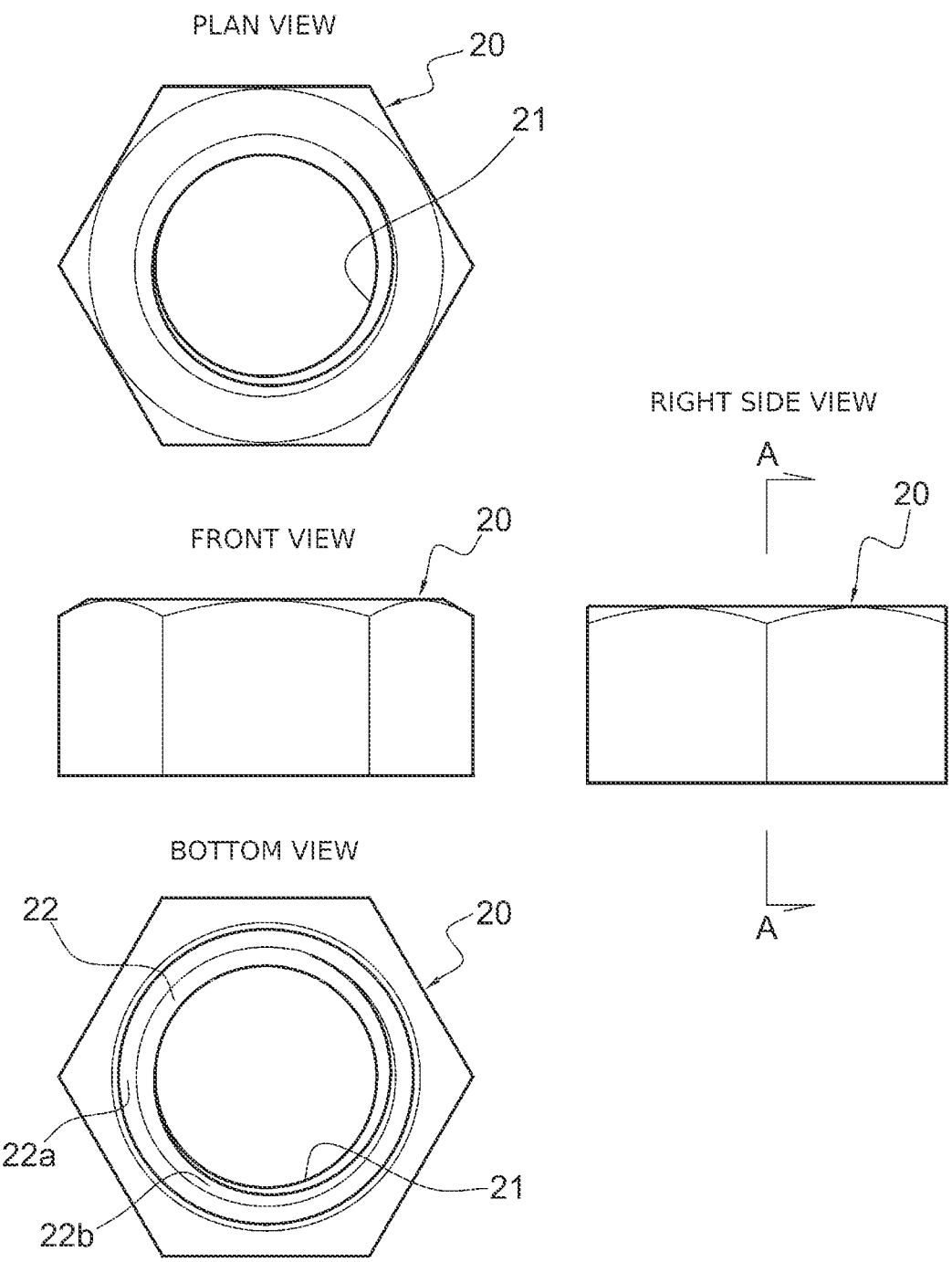
FIG. 2 shows views of the upper nut of the anti-loosening device according to the first embodiment as seen from four different directions.
Figure 3:
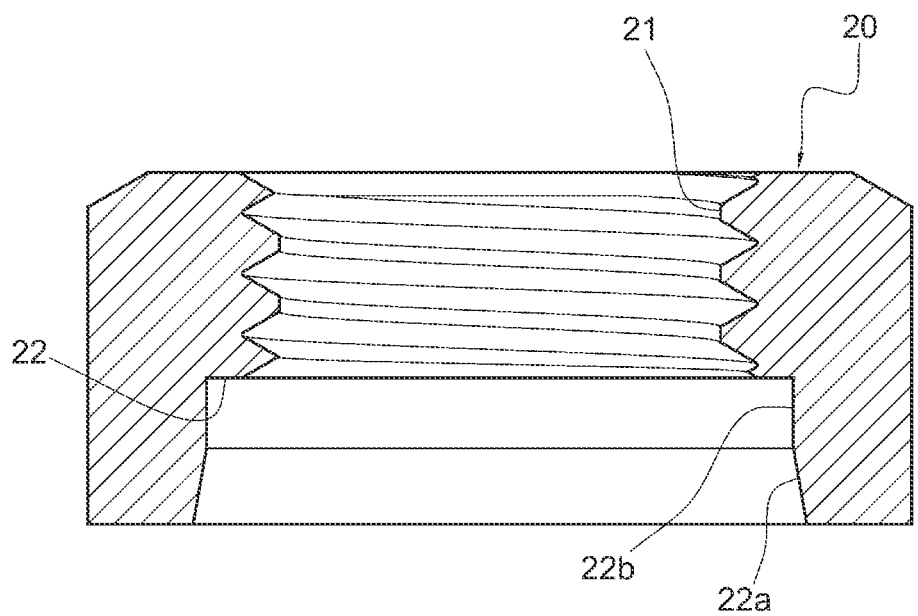
FIG. 3 is an enlarged cross-sectional view of the upper nut taken along line A-A of FIG. 2.
Figure 4:
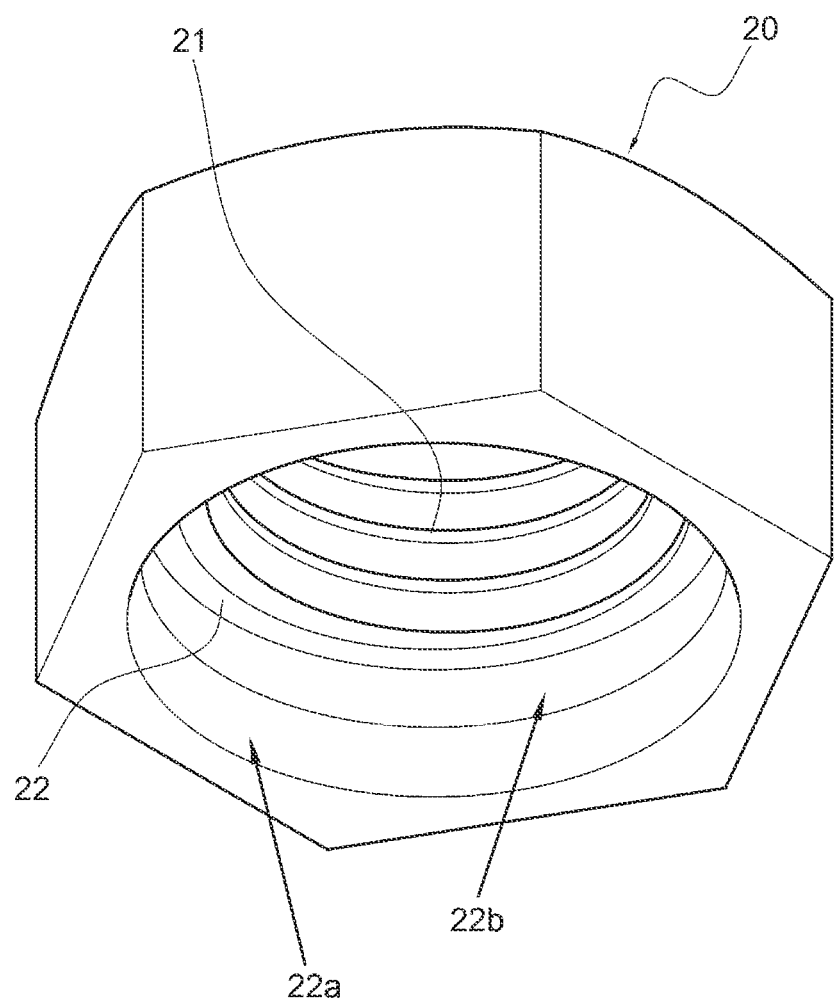
FIG. 4 is a perspective view of the upper nut of the anti-loosening device according to the present embodiment.

An anti-loosening device according to an embodiment of the present invention includes: a first nut having a threaded hole into which a threaded shaft is to be is screwed, and a second nut having a threaded hole into which the threaded shaft is to be screwed, the first nut includes a protrusion protruding in an axial direction toward the second nut, the protrusion includes an outer peripheral surface including a tapered outer peripheral surface portion with a predetermined taper angle, the threaded hole of the first nut extends through the protrusion in the axial direction, the second nut includes a recess adapted to allow the protrusion to be fitted therein, the recess includes an inner peripheral surface including a tapered inner peripheral surface portion with a predetermined taper angle, and the threaded hole of the second nut is open in the bottom surface of the recess.

One of the first and second nuts may function as a lower nut to be tightened first on the threaded shaft and the other may function as an upper nut to be tightened second on the threaded shaft.

In one aspect of the present invention, the tapered outer peripheral surface portion of the protrusion is eccentric from the threaded hole in the first nut and the tapered inner peripheral surface portion of the recess is concentric with the threaded hole in the second nut.

In another aspect of the present invention, the tapered inner peripheral surface portion of the recess is eccentric from the threaded hole in the second nut and the tapered outer peripheral surface portion of the protrusion is concentric with the threaded hole in the first nut.

In both aspects, the anti-loosening device is constructed in such a manner that, with the first and second nuts screwed to the threaded shaft and an eccentric fit established between the protrusion of the first nut and the recess in the second nut, the tapered outer peripheral surface and the tapered inner peripheral surface interfere with each other along part of the circumference so as to produce a pressing force in the direction of eccentricity of the eccentric fit in the first and second nuts, and the larger the depth of fitting of the protrusion into the recess, the larger the pressing force.

The outer peripheral surface of the protrusion of the first nut further includes a distal-end outer peripheral surface portion located closer to the distal end of the protrusion than the tapered outer peripheral surface portion is. The inner peripheral surface of the recess in the second nut further includes a closer-to-bottom inner peripheral surface portion located closer to the bottom of the recess than the tapered inner peripheral surface portion is. The outer peripheral surface of the protrusion and the inner peripheral surface of the recess may be constructed in such a manner that, with the first and second nuts screwed to the threaded shaft and the eccentric fit established between the protrusion of the first nut and the recess in the second nut, the tapered outer peripheral surface portion of the protrusion interferes with the tapered inner peripheral surface portion of the recess along part of the circumference while a gap is formed between the distal-end outer peripheral surface portion of the protrusion and the closer-to-bottom inner peripheral surface portion of the recess along the entire circumference.

In one aspect of the present invention, the outer peripheral surface of the protrusion may be a taper surface having a predetermined taper angle along the entire axial range including the tapered outer peripheral surface portion and the distal-end outer peripheral surface portion. The tapered inner peripheral surface portion of the recess may have the same taper angle as the outer peripheral surface of the protrusion. The closer-to-bottom inner peripheral surface portion of the recess may have a smaller taper angle than the outer peripheral surface of the protrusion. Thus, with the eccentric fit established between the protrusion and the recess, the tapered inner peripheral surface portion of the recess interferes with the tapered outer peripheral surface portion of the protrusion along part of the circumference and the closer-to-bottom inner peripheral surface portion of the recess is gradually radially distanced further from the distal-end outer peripheral surface portion of the protrusion toward the bottom of the recess. The closer-to-bottom inner peripheral surface portion of the recess may be a straight circular cylindrical surface with a taper angle of 0°. Alternatively, the closer-to-bottom inner peripheral surface portion of the recess may be shaped as a reverse taper with a diameter that gradually increases toward the bottom.

In this arrangement, the first nut with the protrusion may be a nut with the same construction as that of a protruding nut of a conventional Hardlock Nut. The second nut with the recess can be easily produced only by adding the additional step of treating the closer-to-bottom inner peripheral surface portion.

In another arrangement different from the present invention, the inner peripheral surface of the recess may be a taper surface having a predetermined taper angle along the entire axial range including the tapered inner peripheral surface portion and the closer-to-bottom inner peripheral surface portion. The tapered outer peripheral surface portion of the protrusion may have the same taper angle as the inner peripheral surface of the recess. The distal-end outer peripheral surface portion of the protrusion may have a larger taper angle than the inner peripheral surface of the recess. Thus, with an eccentric fit established between the protrusion and the recess, the tapered outer peripheral surface portion of the protrusion interferes with the tapered inner peripheral surface portion of the recess along part of the circumference and the distal-end outer peripheral surface portion of the protrusion is gradually radially distanced further from the closer-to-bottom inner peripheral surface portion of the recess toward the distal end of the protrusion. The distal-end outer peripheral surface portion of the protrusion may be eccentric from the tapered outer peripheral surface portion.

In this arrangement, the second nut with the recess may be a nut with the same construction as that of a recessed nut of a conventional Hardlock Nut. The first nut with the protrusion can be easily produced only by adding the additional step of treating the distal-end outer peripheral surface portion.

In one aspect of the present invention, the tapered outer peripheral surface portion of the protrusion and the tapered inner peripheral surface portion of the recess may have the same taper angle, and the distal-end outer peripheral surface portion of the protrusion may have a taper angle larger than the closer-to-bottom inner peripheral surface portion of the recess. Thus, with an eccentric fit established between the protrusion and the recess, the tapered inner peripheral surface portion of the recess interferes with the tapered outer peripheral surface portion of the protrusion along part of the circumference and the closer-to-bottom inner peripheral surface portion of the recess is gradually radially distanced further from the distal-end outer peripheral surface portion of the protrusion toward the bottom of the recess. In this arrangement, the closer-to-bottom inner peripheral surface portion of the recess may be a straight circular cylindrical surface with a taper angle of 0°. Alternatively, the closer-to-bottom inner peripheral surface portion of the recess may be shaped as a reverse taper with a diameter that gradually increases toward the bottom. Further, the distal-end outer peripheral surface portion of the protrusion may be eccentric from the tapered outer peripheral surface portion.

The tapered outer peripheral surface portion of the protrusion may have substantially the same axial length as the tapered inner peripheral surface portion of the recess.

Now, embodiments of the anti-loosening device according to the present invention will be described with reference to the drawings.

First Embodiment

FIG. 1 shows an anti-loosening device 1 according to a first embodiment of the present invention. This anti-loosening device 1 includes a lower nut 10 having a threaded hole 11 into which a threaded shaft S is to be screwed, and an upper nut 20 having a threaded hole 21 into which the threaded shaft S is to be screwed.

The lower nut 10 includes a protrusion 12 shaped as a truncated cone protruding in the axial direction toward the upper nut 20. The protrusion 12 protrudes from the upper surface of the nut body 13. Although the nut body 13 typically has the shape of a hexagonal nut, it may have any suitable outer peripheral shape.

The outer peripheral surface of the protrusion 12 includes a tapered outer peripheral surface portion 12a having a predetermined taper angle with a diameter that gradually decreases toward the distal end, and a distal-end outer peripheral surface portion 12b contiguous to the outer peripheral surface portion 12a and located closer to the distal end of the protrusion 12. In the present embodiment, the outer peripheral surface portions 12a and 12b have the same taper angle. That is, the entire outer peripheral surface of the protrusion 12 including the outer peripheral surface portions 12a and 12b are formed by a single taper surface. This results in an arrangement where the tapered outer peripheral surface portion 12a of the protrusion 12 and the tapered inner peripheral surface portion 22a of the recess 22 have the same taper angle and the distal-end outer peripheral surface portion 12b of the protrusion 12 has a larger taper angle than the closer-to-bottom inner peripheral surface portion 22b of the recess 22.

The taper angle of the tapered outer peripheral surface portion 12a of the protrusion 12 is preferably not smaller than 10° and not larger than 30°, more preferably not smaller than 15° and not larger than 25°, and yet more preferably not smaller than 18° and not larger than 22°.

The threaded hole 11 in the lower nut 10 extends the total dimension of the nut body 13 and protrusion 12. That is, the threaded hole 11 extends through the protrusion 12 and nut body 13 in the axial direction. Further, the threaded hole 11 is located radially inward of the distal-end outer peripheral surface portion 12b of the protrusion 12.

A clearance of a predetermined amount may be provided between the female thread of the threaded hole 11 and the male thread of the threaded shaft S. Thus, when the nut 10 is tightened on the threaded shaft S, the load flanks of the male and female threads are brought into pressure contact, while a very small gap is created between the clearance flanks. Alternatively, no clearance may be provided between the male and female threads, which will also provide a screw tightening arrangement that does not easily loosen, although some galling prevention measure must be taken in this case.

In the implementation shown, the tapered outer peripheral surface portion 12a of the lower nut 10 is eccentric from the threaded hole 11 in the lower nut 10 by a very small amount a. That is, the axis O1 of the tapered outer peripheral surface portion 12a is parallel to the axis O2 of the threaded hole 11, where the axes O1 and O2 are spaced apart by a distance a.

The upper nut 20 has a recess 22 that allows the protrusion 12 to be fitted therein. The recess 22 has a depth that is substantially equal to the protruding height of the protrusion 12 or larger than the protruding height of the protrusion 12 by a predetermined amount. Although the upper nut 20 typically has the shape of a hexagonal nut, it may have any suitable outer peripheral shape. Further, preferably, a flange-shaped abutting portion, as disclosed in Patent Document 3 mentioned above, may be provided on the outer periphery of the lower end of the upper nut 20.

The inner peripheral surface of the recess 22 includes a tapered inner peripheral surface portion 22a having a taper angle that conforms with the taper, and preferably equal to the taper angle, of the outer peripheral surface of the protrusion 12, and a closer-to-bottom inner peripheral surface portion 22b located closer to the bottom of the recess 22 than the inner peripheral surface portion 22a is. In the implementation shown, the closer-to-bottom inner peripheral surface portion 22b is constituted by a straight circular cylindrical surface; alternatively, this portion may be constituted by a taper surface having a taper angle smaller than the taper angle of the outer peripheral surface of the protrusion 12, or by a reverse-taper surface having a diameter that gradually increases toward the bottom of the recess 22, or, in other words, having a negative taper angle.

The threaded hole 21 of the upper nut 20 is open in the bottom surface of the recess 22. That is, the threaded hole 21 is located radially inward of the minimum-diameter portion of the outer side of the upper nut 20.

In the anti-loosening device of the present embodiment, the protrusion 12 of the lower nut 10 and the recess 22 in the upper nut 20 are brought to an eccentric fit such that the threaded shaft S and nuts 10, 20 are in such a stress state as if a wedge had been hammered between the shaft and each nut, and this wedge effect enables the device to exhibit a powerful anti-loosening effect.

In the implementation shown, to achieve an eccentric fit between the protrusion 12 and recess 22, the tapered outer peripheral surface portion 12a of the protrusion 12 of the lower nut 10 is eccentric from the threaded hole 11, while the tapered inner peripheral surface portion 22a of the recess 22 and the threaded hole 21 are concentric with each other. Thus, with the protrusion 12 of the lower nut 10 and the recess 22 in the upper nut 20 screwed onto the threaded shaft S and an eccentric fit established between the protrusion and recess, the outer peripheral surface of the protrusion 12 and inner peripheral surface of the recess 22 interfere with each other along part of the circumference so as to produce forces of repulsion generally in the direction of eccentricity in the upper and lower nuts 10 and 20. The maximum-diameter portion of the tapered outer peripheral surface portion 12a of the protrusion 12 has substantially the same diameter as the maximum-diameter portion of the tapered inner peripheral surface portion 22a of the recess 22, and thus the larger the depth of fitting of the protrusion 12 into the recess 22, the larger the forces of repulsion generally in the direction of eccentricity.

The tightened state of the upper and lower nuts 10 and 20 shown in FIG. 1 is achieved by first tightening the lower nut 10 onto the threaded shaft S to a predetermined tightening torque and then tightening the upper nut 20 onto the threaded shaft S to a predetermined tightening torque. In this implementation, the lower nut 10 is tightened such that the threaded hole 11 in the lower nut 10 is concentric with the threaded shaft S, which produces axial forces in the threaded shaft S and, at the same time, produces large frictional forces on the bearing surface of the lower nut 10. Thus, even when an eccentric fit between the protrusion 12 and recess 22 upon tightening of the upper nut 20 causes pressing forces in the lower nut 10 acting to the right in the drawing, the lower nut 10 is not horizontally displaced relative to the threaded shaft S, and thus the threaded hole 11 in the lower nut 10 remains to be positioned concentric with the threaded shaft S.

On the other hand, the upper nut 20 is slightly movable relative to the threaded shaft S by the amount of the clearance between the female thread of the threaded hole 21 and the male thread of the threaded shaft S. Thus, as shown in FIG. 1, due to the eccentric fit between the protrusion 12 and recess 22, the load flanks and clearance flanks of the female thread of the threaded hole 21 and the male thread of the threaded shaft S are brought into pressure contact along a portion of the circumference (i.e., portions screwed together, shown to the right), while the female thread of the threaded hole 21 floats from the male thread of the thread shaft S or only the load flanks are in light contact along a portion of the circumference diametrically opposite to the present-contact portion (i.e., portions screwed together, shown to the left).

Further, since the distal end of the protrusion 12 is not in contact with the inner peripheral surface of the recess 22, the amount of inclination of the upper nut 20 upon tightening of the upper nut 20 is minimized; as such, even after completion of tightening, the axis O3 of the upper nut 20 is generally parallel to the axis O2 of the lower nut 10. Thus, after completion of tightening of the upper and lower nuts 10 and 20, the gap between the upper surface of the nut body 13 of the lower nut 10 and the bottom surface of the upper nut 20 is smaller and the protrusion 12 is fitted into the recess 22 essentially completely such that the tapered outer peripheral surface portion 12a of the protrusion 12 and the tapered inner peripheral surface portion 22a of the recess 22 are in surface contact or in line contact along part of the circumference, or the region of pressure contact (i.e., contact region to the left in FIG. 1) such that the pressing forces in radial directions generally along the direction of eccentricity produced in the protrusion 12 are dispersed over the axial direction of the protrusion 12. Further, after tightening, the gap between the tapered outer peripheral surface portion 12a and tapered inner peripheral surface portion 22a along the portion of the circumference diametrically opposite to the pressure-contact portion can be minimized, or preferably these surface portions can be in contact, thereby exhibiting the anti-loosening effect in a more stable manner.

(Another Disclosure)

Figure 5:
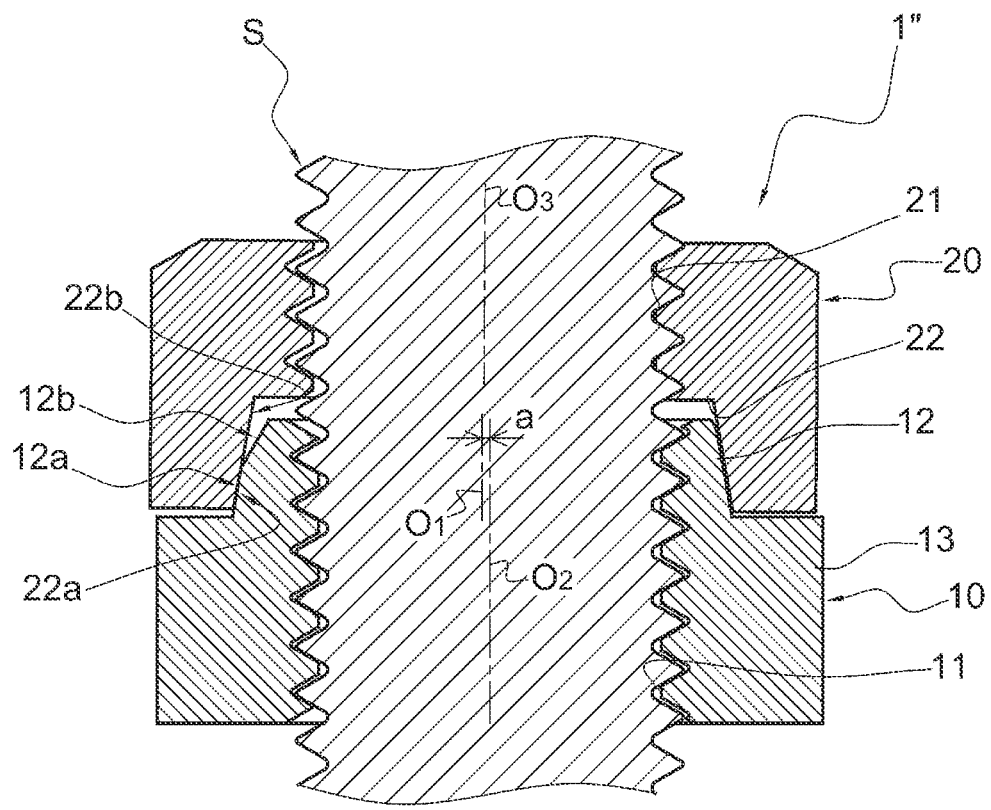
FIG. 5 is a cross-sectional view of an anti-loosening device according to another disclosure.
Figure 6:
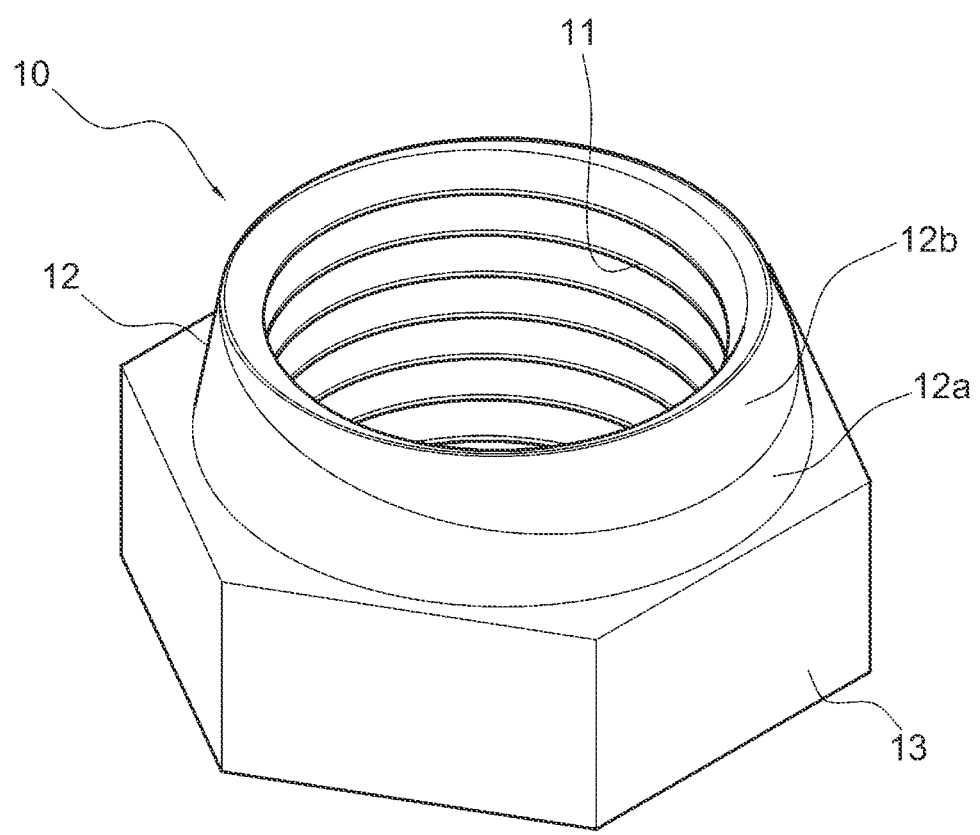
FIG. 6 is a perspective view of the lower nut of the anti-loosening device according to the other disclosure.

An anti-loosening device 1" shown in FIGS. 5 and 6 is different from the anti-loosening device 1 of the first embodiment in the structure of the outer peripheral surface of the protrusion 12 and the structure of the inner peripheral surface of the recess 22. More specifically, the distal-end outer peripheral surface portion 12b of the protrusion 12 has a larger taper angle than the tapered outer peripheral surface portion 12a and is eccentric from the tapered outer peripheral surface portion 12a, but is concentric with the threaded hole 11.

Further, the tapered inner peripheral surface portion 22a and closer-to-bottom inner peripheral surface portion 22b of the recess 22 have the same taper angle. That is, the entire inner peripheral surface of the recess 22 including the inner peripheral surface portions 22a and 22b is formed by a single taper surface. This results in an arrangement where the tapered outer peripheral surface portion 12a of the protrusion 12 and the tapered inner peripheral surface portion 22a of the recess 22 have the same taper angle and the distal-end outer peripheral surface portion 12b of the protrusion 12 has a larger taper angle than the closer-to-bottom inner peripheral surface portion 22b of the recess 22.

Otherwise, this device has the same construction and effects as the anti-loosening device 1 of the first embodiment.

Second Embodiment

Figure 7:
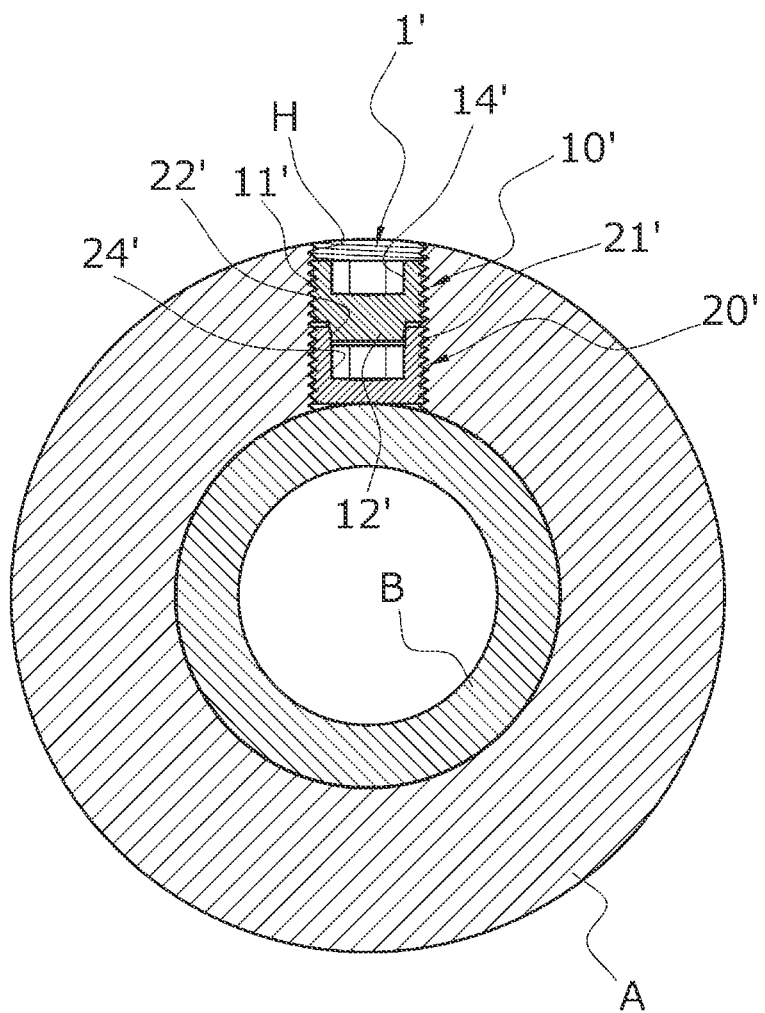
FIG. 7 is a cross-sectional view of an anti-loosening device according to a second embodiment.
Figure 8:
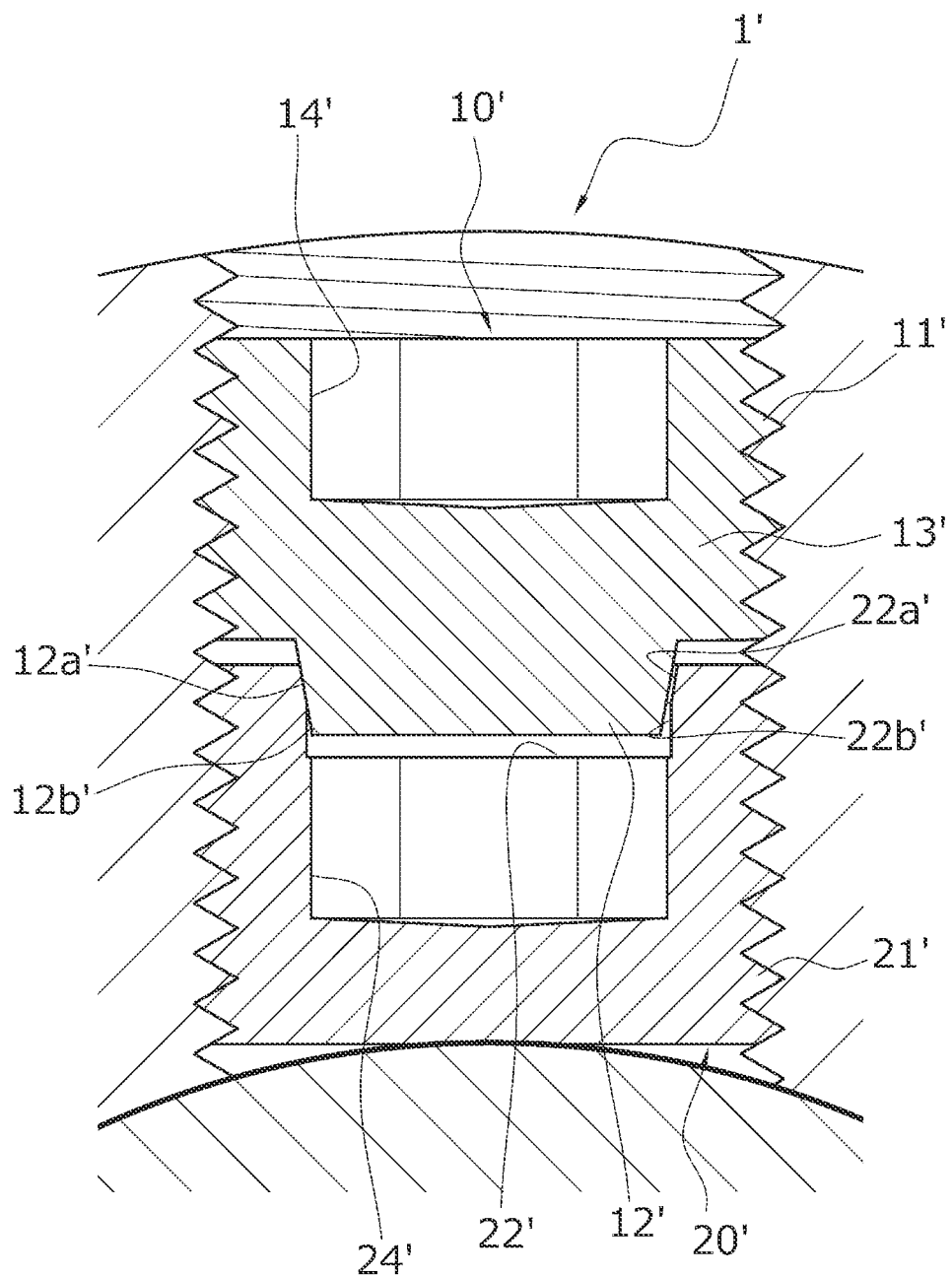
FIG. 8 is an enlarged cross-sectional view of the device of FIG. 7.
Figure 9:
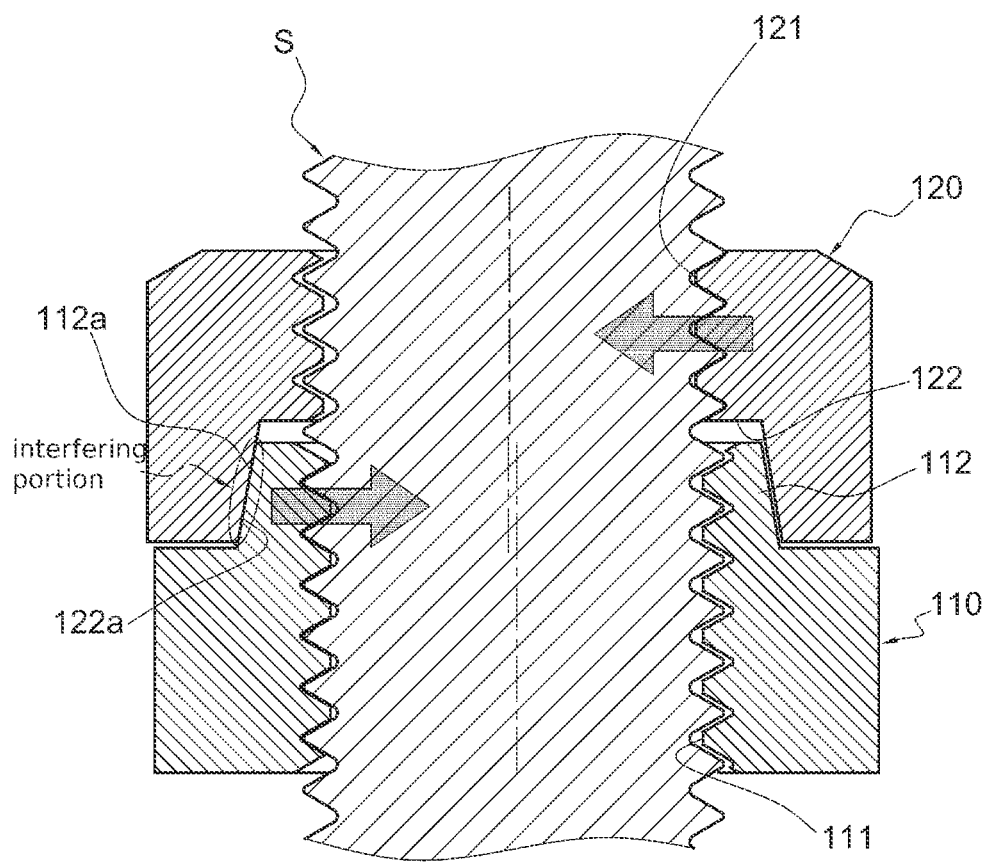
FIG. 9 is a design drawing showing a cross section of a conventional anti-loosening nut.
Figure 10:
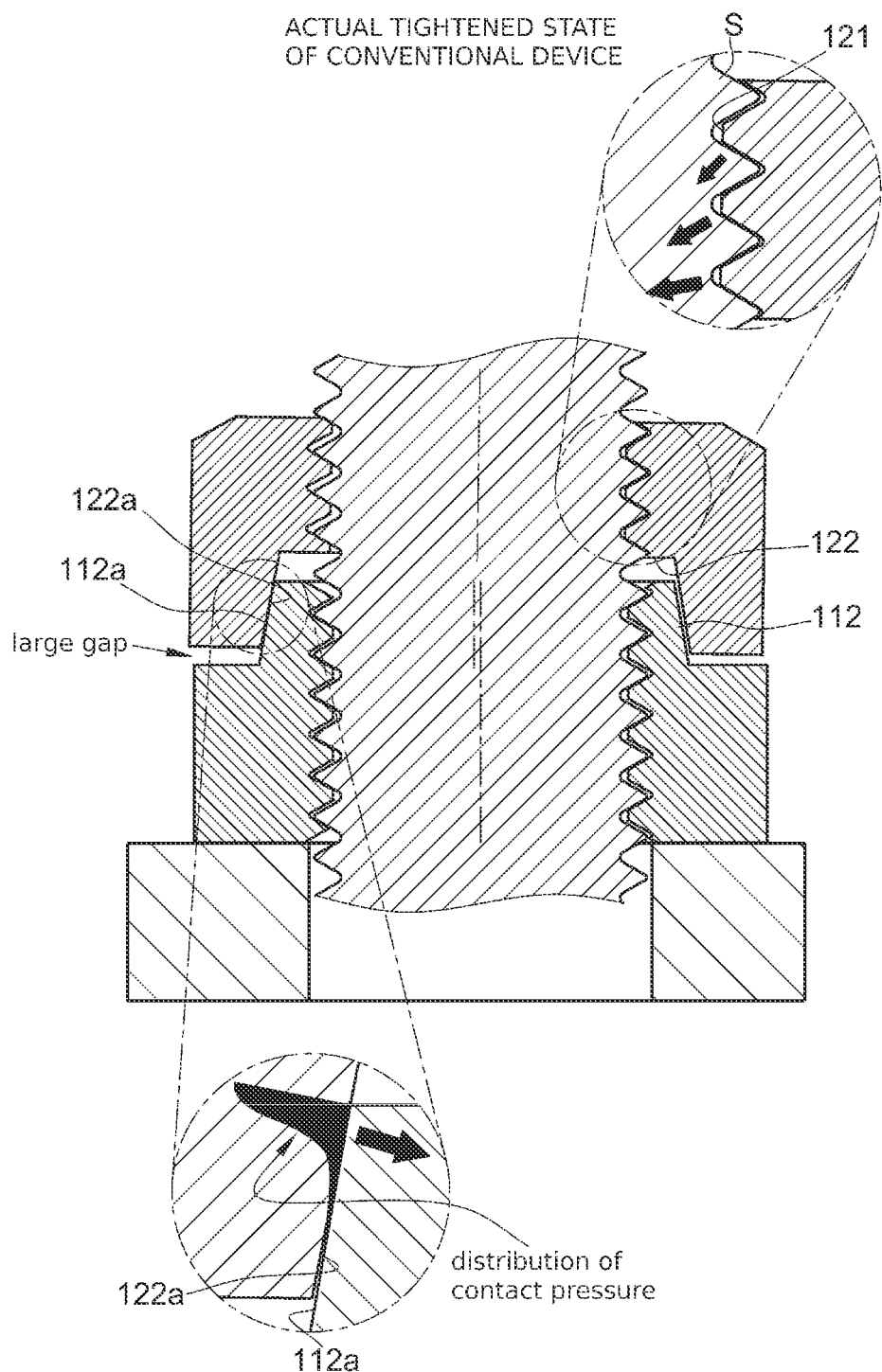
FIG. 10 is a cross-sectional view of the conventional anti-loosening nut in an actual tightened state.

FIGS. 7 and 8 show an anti-loosening device 1' according to a second embodiment of the present invention. The anti-loosening device 1' includes a first screw 10' to screw into a threaded hole H in an mounted member A, and a second screw 20' to screw into the threaded hole H. For example, the anti-loosening device 1' may be used as a set screw for securing, to a tubular mounted member A, a tubular or rod-shaped member B that has been introduced into the mounted member A. The mounted member A has a threaded hole H extending therethrough in a radial direction; as the second screw 20' is tightened and secured onto the member B and then the first screw 10' is tightened onto the second screw 20', a powerful anti-loosening effect can be produced.

The first screw 10' includes a protrusion 12' shaped as a truncated cone protruding in the axial direction toward the second screw 20'. The protrusion 12' protrudes from the distal-end surface of the screw body 13'. The screw body 13' takes the form of a threaded shaft provided with a male thread on its outer periphery. Preferably, the outer-end surface of the screw body 13' is provided with a tool engagement hole 14' that can be engaged by a tool such as an Allen key.

The outer peripheral surface of the protrusion 12' includes a tapered outer peripheral surface portion 12a' having a predetermined taper angle with a diameter that gradually decreases toward the distal end, and a distal-end outer peripheral surface portion 12b' contiguous with the outer peripheral surface portion 12a' and located closer to the distal end of the protrusion 12'. In the present embodiment, the outer peripheral surface portions 12a' and 12b' have the same taper angle. That is, the entire outer peripheral surface of the protrusion 12' including the outer peripheral surface portions 12a' and 12b' is formed by a single taper surface. This results in an arrangement where the tapered outer peripheral surface portion 12a' of the protrusion 12' and the tapered inner peripheral surface portion 22a' of the recess 22' have the same taper angle and the distal-end outer peripheral surface portion 12b' of the protrusion 12' has a larger taper angle than the closer-to-bottom inner peripheral surface portion 22b' of the recess 22'.

The taper angle of the tapered outer peripheral surface portion 12a' of the protrusion 12' is preferably not smaller than 10° and not larger than 30°, more preferably not smaller than 15° and not larger than 25°, and yet more preferably not smaller than 18° and not larger than 22°.

The protrusion 12' of the first screw 10' protrudes from the screw body 13' so as to project axially more that the male thread on the outer periphery of the screw body 13' in the axial direction. Further, the diameter of the male thread is larger than the diameter of the maximum-diameter portion of the protrusion 12'.

A clearance of a predetermined amount may be provided between the female thread of the threaded hole H and the male thread of the first screw 10'. Thus, when the screw 10' is tightened in the threaded hole H, the load flanks of the male and female threads are brought into pressure contact, while a very small gap is created between the clearance flanks. Alternatively, no clearance may be provided between the male and female threads, which will also provide a screw tightening arrangement that does not easily loosen, although some galling prevention measure must be taken in this case.

In the implementation shown, the tapered outer peripheral surface portion 12a' of the screw 10' is eccentric from the male thread 11' of the screw 10' by a very small amount.

The second screw 20' has a recess 22' that allows the protrusion 12' to be fitted therein. The recess 22' has a depth that is substantially equal to the protruding height of the protrusion 12' or larger than the protruding height of the protrusion 12' by a predetermined amount. The screw 20' may take the form of a threaded shaft provided with a male thread on its outer periphery.

The inner peripheral surface of the recess 22' includes a tapered inner peripheral surface portion 22a' having a taper angle that conforms with the taper, and preferably equal to the taper angle, of the outer peripheral surface of the protrusion 12', and a closer-to-bottom inner peripheral surface portion 22b' located closer to the bottom of the recess 22' than the inner peripheral surface portion 22a'. In the implementation shown, the closer-to-bottom inner peripheral surface portion 22b' is constituted by a straight circular cylindrical surface; alternatively, this portion may be constituted by a taper surface having a taper angle smaller than the taper angle of the outer peripheral surface of the protrusion 12', or by a reverse-taper surface having a diameter that gradually increases toward the bottom of the recess 22', or, in other words, having a negative taper angle.

Preferably, in the recess 22' composed of the tapered inner peripheral surface portion 22a' and closer-to-bottom inner peripheral surface portion 22b', a tool engagement hole 24' engageable by a rotating tool such as an Allen key is provided that is located further along the direction from the bottom (i.e., interior) of the recess. It is to be noted that the inner peripheral surface of the tool engagement hole 24' is not a taper surface; instead, the tool engagement hole 24' is a non-circular hole that matches the shape of the tool. The hole 24' is open in the bottom surface of the recess 22, located radially inward of the closer-to-bottom inner peripheral surface portion 22a.

The male thread 21' of the screw 20' extends along the entire axial length of the screw 20'. That is, the recess 22' is located radially inward of the male thread 21'.

In the anti-loosening device of the present embodiment, the protrusion 12' of the screw 10' and the recess 22' in the screw 20' are brought to an eccentric fit such that the threaded hole H and screws 10', 20' are in such a stress state as if a wedge had been hammered between the hole and each screw, and this wedge effect enables the device to exhibit a powerful anti-loosening effect.

In the implementation shown, to achieve an eccentric fit between the protrusion 12' and recess 22', the tapered outer peripheral surface portion 12a' of the protrusion 12' is eccentric from the male thread 11', while the tapered inner peripheral surface portion 22a' of the recess 22' and the male thread 21' are concentric with each other. Thus, with the protrusion 12' of the screw 10' and the recess 22' in the screw 20' screwed into the thread hole H and an eccentric fit established between the protrusion and recess, the outer peripheral surface of the protrusion 12' and inner peripheral surface of the recess 22' interfere with each other along part of the circumference so as to produce forces of repulsion generally in the direction of eccentricity in both screws 10' and 20'. The maximum-diameter portion of the tapered outer peripheral surface portion 12a' of the protrusion 12' has substantially the same diameter as the maximum-diameter portion of the tapered inner peripheral surface portion 22a' of the recess 22', and thus the larger the depth of fitting of the protrusion 12' into the recess 22', the larger the forces of repulsion generally in the direction of eccentricity.

The stress state and the conditions of contact between the load flank and clearance flank of the threads upon tightening of the screws 10' and 20' are the same as those for the first embodiment described above.

The present invention is not limited to the constructions of the above-described embodiments, and may be modified in design as appropriate within the scope of the invention recited in the claims. For example, although the constructions of the first and second embodiments each have a recess with a closer-to-bottom inner peripheral surface portion extending along the entire circumference, a closer-to-bottom inner peripheral surface portion with a smaller taper angle than the tapered inner peripheral surface portion may only extend along portions of the circumference of the recess that are to be brought into pressure contact with the protrusion by an eccentric fit.

EXPLANATION OF CHARACTERS

1: anti-loosening device
10: first nut (first threaded member)
11: thread (female thread)
12: protrusion
12a: tapered outer peripheral surface portion
12b: distal-end outer peripheral surface portion
20: second nut (second threaded member)
21: thread (female thread)
22: recess
22a: tapered inner peripheral surface portion
22b: closer-to-bottom inner peripheral surface portion
1': anti-loosening device
10': first screw (first threaded member)
11': thread (male thread)
12': protrusion
12a': tapered outer peripheral surface portion
12b': distal-end outer peripheral surface portion
20': second screw (second threaded member)
21': thread (male thread)
22': recess
22a': tapered inner peripheral surface portion
22b': closer-to-bottom inner peripheral surface portion

The invention claimed is:

1. An anti-loosening device including a first threaded member having a thread adapted to be screwed to a mounted member, and a second threaded member having a thread adapted to be screwed to the mounted member,
wherein the first threaded member includes a protrusion protruding in an axial direction toward the second threaded member, the protrusion having an outer peripheral surface including a tapered outer peripheral surface portion with a predetermined taper angle;

the second threaded member includes a recess adapted to allow the protrusion to be fitted therein, the recess having an inner peripheral surface including a tapered inner peripheral surface portion with a predetermined taper angle; and the tapered outer peripheral surface portion of the protrusion is eccentric from the thread on the first threaded member and the tapered inner peripheral surface portion of the recess is concentric with the thread on the second threaded member, or the tapered inner peripheral surface portion of the recess is eccentric from the thread on the second threaded member and the tapered outer peripheral surface portion of the protrusion is concentric with the thread on the first threaded member;

with the first and second threaded members screwed to the mounted member and an eccentric fit established between the protrusion of the first threaded member and the recess in the second threaded member, the tapered outer peripheral surface and the tapered inner peripheral surface interfere with each other along part of a circumference so as to produce a pressing force in a direction of eccentricity of the eccentric fit in the first and second threaded members, and the larger a depth of fitting of the protrusion into the recess, the larger the pressing force;

characterized in that the outer peripheral surface of the protrusion of the first threaded member further includes a distal-end outer peripheral surface portion located closer to a distal end of the protrusion than the tapered outer peripheral surface portion is, the inner peripheral surface of the recess in the second threaded member further includes a closer-to-bottom inner peripheral surface portion located closer to a bottom of the recess than the tapered inner peripheral surface portion is, the outer peripheral surface of the protrusion and the inner peripheral surface of the recess are constructed in such a manner that, with the first and second threaded members screwed to the mounted member and an eccentric fit established between the protrusion of the first threaded member and the recess in the second threaded member, the tapered outer peripheral surface portion of the protrusion interferes with the tapered inner peripheral surface portion of the recess along part of the circumference while a gap is formed between the distal-end outer peripheral surface portion of the protrusion and the closer-to-bottom inner peripheral surface portion of the recess along the entire circumference, the outer peripheral surface of the protrusion is a taper surface having a predetermined taper angle along an entire axial range including the tapered outer peripheral surface portion and the distal-end outer peripheral surface portion, the tapered inner peripheral surface portion of the recess has the same taper angle as the outer peripheral surface of the protrusion and the closer-to-bottom inner peripheral surface portion of the recess is a straight cylindrical surface or a taper surface having a smaller taper angle than the outer peripheral surface of the protrusion, and the tapered inner peripheral surface portion of the recess and the closer-to-bottom inner peripheral surface portion of the recess are constructed in such a manner that, with the eccentric fit established between the protrusion and the recess, the tapered inner peripheral surface portion interferes with the tapered outer peripheral surface portion of the protrusion along part of the circumference and the closer-to-bottom inner peripheral surface portion is gradually radially distanced further from the distal-end outer peripheral surface portion of the protrusion toward the bottom of the recess, wherein the closer-to-bottom inner peripheral surface portion of the recess is a straight circular cylindrical surface with a taper angle of 0°.

2. The anti-loosening device according to claim 1, wherein the mounted member includes a threaded hole, each of the first and second threaded members is a screw that screws into the threaded hole, and each of the threads on the first and second threaded members is a male thread.

3. An anti-loosening device including a first threaded member having a thread adapted to be screwed to a mounted member, and a second threaded member having a thread adapted to be screwed to the mounted member, wherein the first threaded member includes a protrusion protruding in an axial direction toward the second threaded member, the protrusion having an outer peripheral surface including a tapered outer peripheral surface portion with a predetermined taper angle;

the second threaded member includes a recess adapted to allow the protrusion to be fitted therein, the recess having an inner peripheral surface including a tapered inner peripheral surface portion with a predetermined taper angle; and the tapered outer peripheral surface portion of the protrusion is eccentric from the thread on the first threaded member and the tapered inner peripheral surface portion of the recess is concentric with the thread on the second threaded member, or the tapered inner peripheral surface portion of the recess is eccentric from the thread on the second threaded member and the tapered outer peripheral surface portion of the protrusion is concentric with the thread on the first threaded member;

with the first and second threaded members screwed to the mounted member and an eccentric fit established between the protrusion of the first threaded member and the recess in the second threaded member, the tapered outer peripheral surface and the tapered inner peripheral surface interfere with each other along part of a circumference so as to produce a pressing force in a direction of eccentricity of the eccentric fit in the first and second threaded members, and the larger a depth of fitting of the protrusion into the recess, the larger the pressing force;

characterized in that the outer peripheral surface of the protrusion of the first threaded member further includes a distal-end outer peripheral surface portion located closer to a distal end of the protrusion than the tapered outer peripheral surface portion is, the inner peripheral surface of the recess in the second threaded member further includes a closer-to-bottom inner peripheral surface portion located closer to a bottom of the recess than the tapered inner peripheral surface portion is, the outer peripheral surface of the protrusion and the inner peripheral surface of the recess are constructed in such a manner that, with the first and second threaded members screwed to the mounted member and an eccentric fit established between the protrusion of the first threaded member and the recess in the second threaded member, the tapered outer peripheral surface portion of the protrusion interferes with the tapered inner peripheral surface portion of the recess along part of the circumference while a gap is formed between the distal-end outer peripheral surface portion of the protrusion and the closer-to-bottom inner peripheral surface portion of the recess along the entire circumference, the outer peripheral surface of the protrusion is a taper surface having a predetermined taper angle along an entire axial range including the tapered outer peripheral surface portion and the distal-end outer peripheral surface portion, the tapered inner peripheral surface portion of the recess has the same taper angle as the outer peripheral surface of the protrusion and the closer-to-bottom inner peripheral surface portion of the recess is a straight cylindrical surface or a taper surface having a smaller taper angle than the outer peripheral surface of the protrusion, and the tapered inner peripheral surface portion of the recess and the closer-to-bottom inner peripheral surface portion of the recess are constructed in such a manner that, with the eccentric fit established between the protrusion and the recess, the tapered inner peripheral surface portion interferes with the tapered outer peripheral surface portion of the protrusion along part of the circumference and the closer-to-bottom inner peripheral surface portion is gradually radially distanced further from the distal-end outer peripheral surface portion of the protrusion toward the bottom of the recess, wherein the mounted member is a threaded shaft, each of the first and second threaded members is a nut into which the threaded shaft is to be screwed, and each of the threads on the first and second threaded members is a female thread.

\* \* \* \* \*